United States Patent
Bingel et al.

(10) Patent No.: US 6,477,212 B1
(45) Date of Patent: *Nov. 5, 2002

(54) METHOD AND APPARATUS FOR REDUCING INTERFERENCE IN A TWISTED WIRE PAIR TRANSMISSION SYSTEM

(75) Inventors: Thomas J. Bingel, Belleair Beach, FL (US); Ramon B. Hazen, N. Redington Beach, FL (US)

(73) Assignee: Paradyne Corporation, Largo, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/756,382

(22) Filed: Jan. 8, 2001

Related U.S. Application Data

(63) Continuation of application No. 08/966,180, filed on Nov. 7, 1997, now Pat. No. 6,173,021.
(60) Provisional application No. 60/050,527, filed on Jun. 23, 1997.

(51) Int. Cl.[7] .......................... H04B 3/00; H04L 25/08; H03D 1/04; H03B 1/10
(52) U.S. Cl. .................. 375/346; 375/257; 379/416
(58) Field of Search ................. 375/232, 233, 375/257, 285, 340, 346, 377; 455/295, 296, 63, 79, 138; 370/201; 348/607; 379/416; 333/12

(56) References Cited

U.S. PATENT DOCUMENTS

| | | | |
|---|---|---|---|
| 3,699,444 A | 10/1972 | Ghose et al. ................. 325/21 |
| 4,673,982 A | 6/1987 | Tam et al. ................... 358/167 |
| 4,736,455 A | 4/1988 | Matsue et al. ............... 455/138 |
| 4,952,193 A | 8/1990 | Talwar ......................... 455/63 |
| 4,965,854 A | 10/1990 | Glazebrook ................. 455/224 |
| 4,992,798 A | 2/1991 | Nozue et al. ............... 342/362 |
| 4,995,104 A | 2/1991 | Gitlin ............................ 370/6 |
| 5,157,690 A | 10/1992 | Buttle ......................... 375/14 |
| 5,170,489 A | 12/1992 | Glazebrook ................. 455/63 |
| 5,345,476 A | 9/1994 | Tsujimoto ................... 375/14 |
| 6,173,021 B1 | 1/2001 | Bingel et al. ............... 375/346 |
| 6,330,275 B1 * | 12/2001 | Bremer ....................... 375/346 |

* cited by examiner

*Primary Examiner*—Betsy L. Deppe
(74) *Attorney, Agent, or Firm*—Thomas, Kayden, Horstemeyer & Risley, LLP

(57) ABSTRACT

The present invention provides a method and apparatus for eliminating or reducing local area and broad area interference in a twisted pair transmission system. The apparatus of the present invention includes a detection device, such as an antenna, for example, for detecting electromagnetic interference coupled into a twisted pair line, a sampling/scaling device which samples and scales the detected signal, and a combiner device which combines a signal correction component with the signal received over the twisted pair by a differential receiver. The sampling/scaling device preferably includes an analog-to-digital converter (ADC) which converts the detected analog signal into a digital signal and a digital signal processor, which receives the digital signal from the ADC and processes the signal to generate a correction signal. The correction signal is then subtracted from the signal received by the differential receiver. The sampling/scaling device may be fixed or adaptive.

20 Claims, 2 Drawing Sheets

METHOD AND APPARATUS FOR REDUCING INTERFERENCE IN A TWISTED WIRE PAIR TRANSMISSION SYSTEM

CROSS REFERENCE TO RELATED APPLICATION

This application is a continuation of application Ser. No. 08/966,180, filed on Nov. 7, 1997, entitled Method and Apparatus for Reducing Interference in a Twisted-Pair Transmission System, now U.S. Pat. No. 6,173,021, which claims priority to and the benefit of the filing date of co-pending provisional application entitled RADIO INTERFERENCE CANCELER, Ser. No. 60/050,527, filed Jun. 23, 1997. The above-referenced provisional application is incorporated herein by reference.

TECHNICAL FIELD OF THE INVENTION

This invention generally relates to the field of communications and, more particularly, to a method and apparatus which detects interference in a twisted wire pair caused by sources external to the transmission system and which eliminates or reduces the effects of the interference.

BACKGROUND OF THE INVENTION

Twisted pairs of copper telephone wire, commonly referred to as twisted pairs, have been in existence since the late nineteenth century when Alexander Graham Bell first invented them. In fact, most of the transmission lines in the U.S. telephone network, commonly referred to as the telephone loop plant, are twisted pairs. Although much of the loop plant has been or is currently being upgraded with optical fiber, it is expected that twisted pair technology will remain in place for many years due to the high cost of upgrading and due to the ability to achieve high transmission rates over twisted pairs.

Digital subscriber line (DSL) technology, first developed to support basic rate integrated services digital network (ISDN) transmission over twisted pair, has made it possible to achieve high transmission rates of video, audio and data over twisted pairs. Today, there are many variations of DSL technology in use, such as asymmetric digital subscriber line (ADSL), high-bit-rate DSL (HDSL), and rate-adaptive DSL (RADSL), which are collectively classified under the rubric "xDSL". All of these technologies correspond to line coding schemes which can be used to transmit and receive voice, video, and data over existing copper twisted pairs.

Twisted pairs attenuate signals in proportion to the length of the line and the frequency. In order to compensate for this characteristic, telephone companies design lines in accordance with certain standards designed to maximize performance, such as requiring that wires which extend over certain distances be a certain gauge and requiring that loading coils be installed on lines in many cases. Although, attenuation generally is the dominant factor affecting performance of twisted pairs, cross talk also affects performance. Cross talk corresponds to interference in a twisted pair caused by an adjacent twisted pair. Cross talk increases with frequency and with the number of cross-talking pairs. ADSL was developed to reduce the effects of cross talk. In accordance with ADSL technology, data is transmitted upstream at one rate and downstream at a much higher rate than the upstream rate, with the upstream and downstream data being separated through the use of frequency division multiplexing.

Another factor which affects the performance of twisted pairs is near and far end echo resulting from impedance differences created by telephone loop hybrid circuits. Telephone loop hybrid circuits are necessary in order to enable full duplexing of the signals transmitted between the end user and the central office. Echo cancellation techniques allow the echo to be calculated and canceled out to improve signal quality. Echo cancellation technology has now been widely implemented and most modems manufactured today contain an echo cancellation component.

Another factor which affects the performance of twisted pairs is noise or interference created by sources which are external to the telephone network. This interference may emanate from local area sources, such as electrical wiring within the customer premises, or from broad area sources, such as power lines which run along side the telephone lines within the loop plant and from radio transmitting stations. It would be beneficial to provide a method and apparatus capable of eliminating or reducing local area and broad area interference in a twisted pair transmission system in order to maximize performance of twisted pairs.

SUMMARY OF THE INVENTION

The present invention provides a method and apparatus for eliminating or reducing local area and broad area interference in a twisted pair transmission system. The apparatus of the present invention comprises a detection device, such as an antenna, for example, for acquiring representative electromagnetic interference coupled into a twisted pair line, a sampling/scaling device which samples and scales the acquired signal, and a combiner device which combines a signal correction component with the signal received over the twisted pair by a differential receiver.

In accordance with the preferred embodiment of the present invention, the sampling/scaling device comprises an analog-to-digital converter which converts the detected analog signal into a digital signal and a digital signal processor which receives the digital signal from the ADC and processes the signal to generate a correction signal. The correction signal is scaled in amplitude and phase such that, when subtracted from the received signal, it will cancel the additive interference that was present in the received signal. The correction signal is then subtracted from the signal received by the differential receiver from the twisted pair. The sampling/scaling device may be fixed or adaptive. If the interference is stationary in time, a fixed sampling/scaling device is suitable for use with the present invention. If the interference is non-stationary, preferably the sampling/scaling device will be adaptive such that the amount of scaling performed can be altered in accordance with changes in the interference signal detected by the detector.

The detector may be any device capable of detecting the interference, such as, for example, a capacitor, an antenna, or an induction coil, or a combination of two or more of these. The type of detector used will depend on the type of interference being coupled into the twisted pair transmission system.

DETAILED DESCRIPTION OF THE PREFERRED EMBODIMENT

Figure 1:
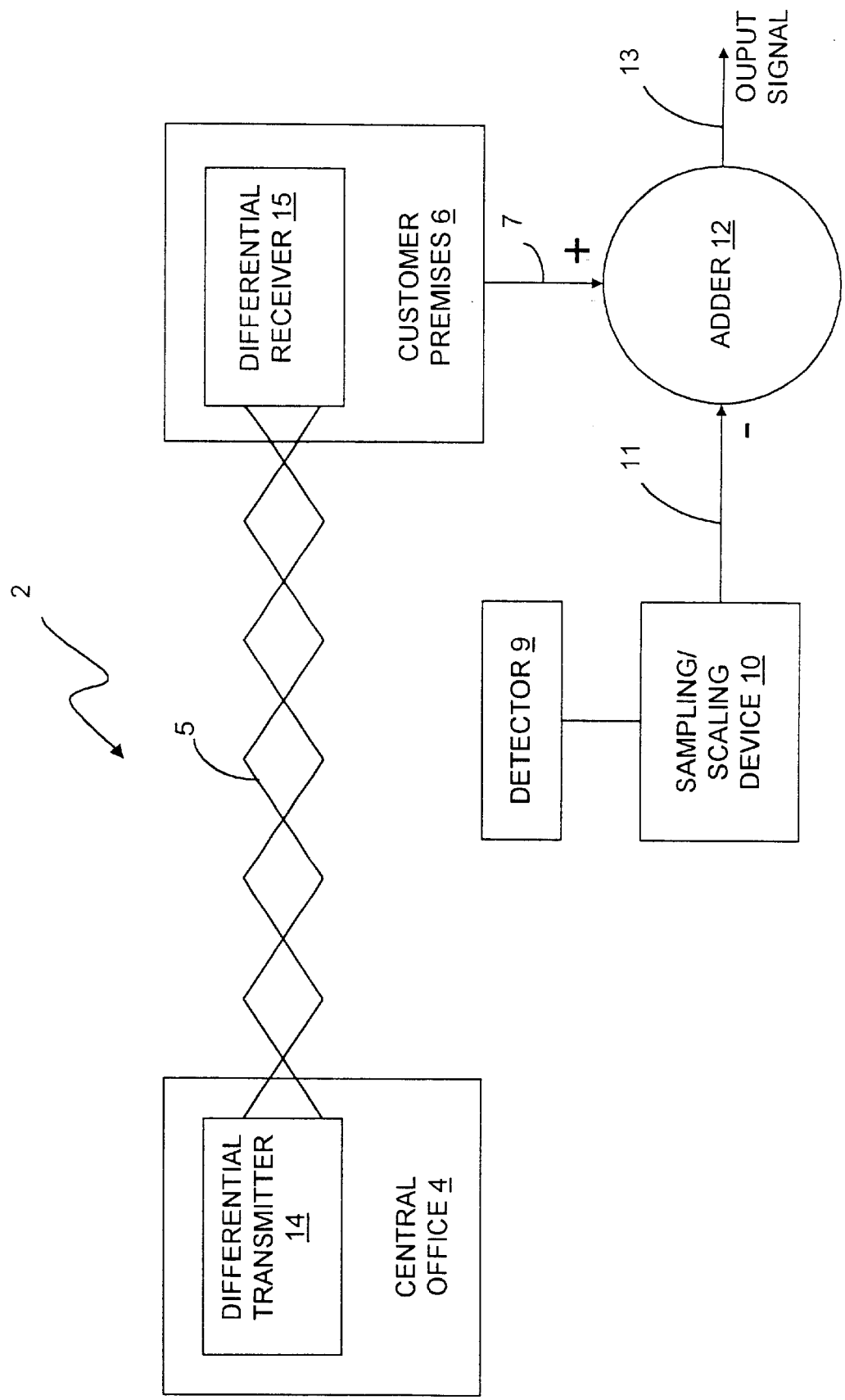
FIG. 1 is a functional block diagram illustrating the method and apparatus of the present invention for detecting and eliminating interference in a twisted pair.

FIG. 1 functionally illustrates the interference canceler apparatus of the present invention for detecting and eliminating interference coupled into a twisted pair transmission system 2 from a source external to the system. A differential transmitter 14 located at the central office 4 outputs signals onto twisted pair 5 to be sent to a differential receiver 15 located at the customer premises 6. During the transmission of the signal to the customer premises 6, which may be a home or office, for example, electromagnetic interference may be coupled into the twisted pair 5. The interference may emanate from broad area sources (not shown), which may be, for example, power lines running along side the twisted pair 5 from the central office 4, or from local area sources (not shown), which may be, for example, electrical wiring inside of the customer premises 6 or a radio transmitting station.

A detector 9 detects the broad or local area interference being coupled into twisted pair 5 and generates an analog signal relating to the detected interference signal. This analog signal is then input to a sampling/scaling device 10 which samples and scales the signal to produce an interference cancellation signal. The interference cancellation signal, or correction signal, on line 11 is scaled in amplitude and phase such that, when subtracted from the received signal on line 7, it will cancel the additive interference that was present in the received signal. The interference cancellation signal on line 11 is subtracted from the received signal on line 7 by adder 12 to eliminate the interference to produce output signal 13.

Preferably, the interference canceler of the present invention is incorporated into a modem, such as a DSL modem. However, it will be apparent to those skilled in the art that it is not necessary for the interference canceler to be incorporated into a modem and that the interference canceler may be implemented separately from a modem. In accordance with the first embodiment of the present invention, the sampling/scaling device 10 and adder 12 are implemented in analog hardware. The signal received by differential receiver 15 is an analog signal. The differential receiver 15 may be a component in, for example, a DSL modem or some other data communication equipment (DCE). The analog sampling/scaling device 10 may comprise typical filter and amplification circuitry for sampling and scaling the received analog signal.

In accordance with the first embodiment, the detector 9 may be implemented as any type of analog component or circuit designed to detect magnetic and/or electrical interference. The detected interference is then sampled and scaled by sampling/scaling device 10 and subtracted by adder 12 from the signal received by differential receiver 15 to eliminate or reduce the interference. The adder 12 can be any analog circuit or device capable of combining the interference cancellation signal produced by the sampling/scaling device 10 with the signal output from the differential receiver 15.

The detector 9 may be, for example, a dipole antenna constructed to receive a preselected bandwidth of signals. Alternatively, it may be desirable to construct the detector 9 as a broadband or narrowband antenna or antenna array. It may also be desirable to construct the detector 9 as a scanning antenna array which is capable of scanning for interfering signals over a plurality of frequency ranges. Alternatively, it may be desirable to implement the detector 9 as a capacitively-coupled circuit located in proximity to the twisted pair 5 which detects electrical interference coupled into the twisted pair 5. Alternatively, it may be desirable to implement the detector 9 as an induction coil located in proximity to the twisted pair 5 which detects magnetic interference coupled into the twisted pair 5. It will be apparent to those skilled in the art that the present invention is not limited with respect to the components used to detect and eliminate interference coupled into twisted pair 5.

Figure 2:
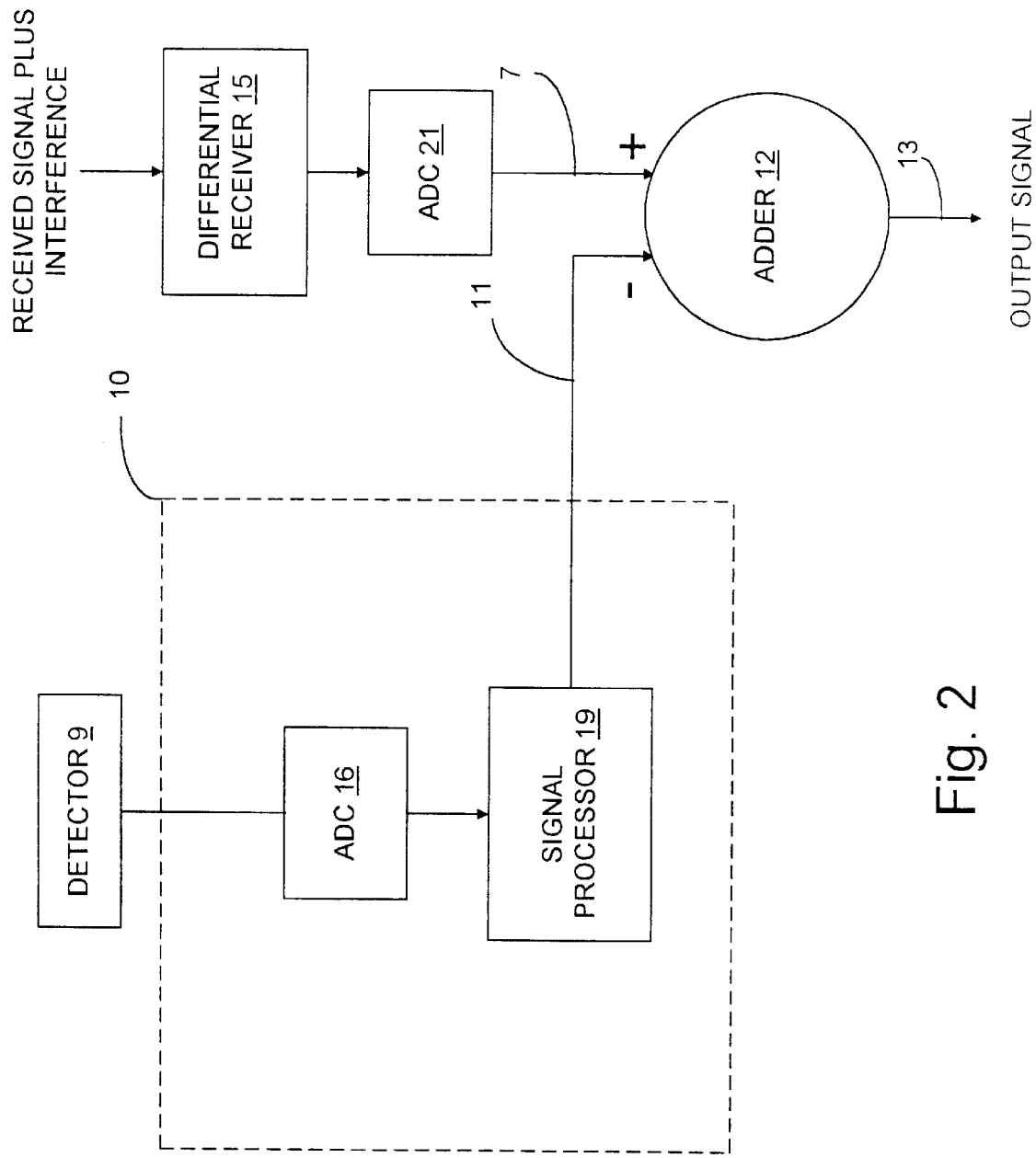
FIG. 2 is a block diagram illustrating the sampling/scaling device of the present invention in accordance with the preferred embodiment of the present invention.

FIG. 2 is a block diagram functionally illustrating the preferred embodiment of the interference canceler apparatus of the present invention. In accordance with this embodiment, the interference canceler is implemented in digital circuitry. The sampling/scaling device 10 receives the interference signal from the detector 9 and inputs it to ADC 16 which samples the analog signal and converts it into a digital signal. The digital signal is then output to a signal processor 19 which can be fixed or adaptive. The signal processor 19 preferably is a digital signal processor (DSP) which performs one or more mathematical algorithms on the input signal to produce an interference cancellation signal.

It will be apparent to those skilled in the art that the present invention is not limited with respect to the types of operations performed by the signal processor 19. It will also be apparent to those skilled in the art that the present invention is not limited with respect to the type of signal processor 19 selected for use with the present invention. It should be noted that the signal processor 19 can be implemented solely in hardware, such as, for example, in a state machine or in an application specific integrated circuit (ASIC), or it can be implemented in a combination of hardware and software, such as, for example, in a microprocessor which is programmed with software to perform the necessary operations.

It will be apparent to those skilled in the art that many variations and modifications can be made to the present invention without departing from the spirit and scope of the present invention. For example, although the present invention has been described with respect to its use for detecting and eliminating interference in twisted pairs, it will be apparent to those skilled in the art that the present invention may be useful for detecting and canceling interference in other types of transmission environments.

What is claimed is:

1. An apparatus for canceling interference coupled into a twisted wire pair of a transmission system connecting a central office to a customer premises, the apparatus comprising:

a receiver coupled to first ends of the twisted wire pair, the receiver receiving an electrical signal being propagated along the twisted wire pair;

a detector disposed to detect the interference coupled into the twisted wire pair, the detector generating a signal relating to the detected interference, wherein the interference is generated by a source external to the transmission system;

a sampling/scaling device coupled to the detector, the sampling/scaling device receiving the signal generated by the detector and sampling and scaling the signal to produce an interference cancellation signal;

an adder device coupled to the receiver and to the sampling/scaling device, the adder device receiving a first input signal from the receiver, the first input signal relating to the signal received by the receiver from the twisted pair, the adder device receiving a second input signal, the second input signal relating to the interference cancellation signal produced by the sampling/scaling device, the adder device combining the first and second input signals to eliminate or reduce interference contained in the first input signal, wherein the apparatus is located at one end of the twisted wire pair.

2. The apparatus of claim 1, wherein the interference is interference created by sources between the central office and the customer premises, the receiver being located at the customer premises and the twisted pair having second ends opposite the first ends, the second ends being coupled to the central office.

3. The apparatus of claim 1, wherein the interference is interference created by sources within the customer premises, and wherein the receiver is located at the customer premises.

4. The apparatus of claim 1, wherein the receiver is a differential receiver contained in a modem.

5. The apparatus of claim 1, wherein the detector is an antenna.

6. The apparatus of claim 1, wherein the detector is an induction coil located in proximity to the twisted wire pair.

7. The apparatus of claim 1, wherein the detector is a capacitor located in proximity to the twisted wire pair.

8. The apparatus of claim 1, wherein the sampling/scaling device is an analog circuit and wherein the interference cancellation signal is an analog signal.

9. The apparatus of claim 8, wherein the first input signal is an analog signal and wherein the second input signal is an analog signal, and wherein the adder device subtracts the second input signal from the first input signal to eliminate or reduce interference contained in the first input signal.

10. The apparatus of claim 1, wherein the sampling/scaling device comprises an analog-to-digital converter which converts the signal received from the detector into a digital signal, the sampling/scaling device comprising a signal processor which receives the digital signal from the analog-to-digital converter and processes the digital signal to generate the interference cancellation signal, the interference cancellation being a digital signal, wherein the receiver comprises an analog-to-digital converter which converts the signal received by the receiver into a digital signal, the first and second input signals being digital signals, the adder subtracting the second input signal from the first input signal to eliminate or reduce interference contained in the first input signal.

11. The apparatus of claim 10, wherein the interference changes with respect to time and wherein the signal processor is an adaptive signal processor which adapts in accordance with changes in the interference.

12. An apparatus for canceling interference coupled into a twisted wire pair of a transmission system connecting a central office to a customer premises, the apparatus comprising:

means for receiving an electrical signal being propagated along the twisted wire pair;

means for detecting interference coupled into the twisted wire pair, wherein the means for detecting generates a signal relating to the detected interference, and wherein the interference is generated by a source external to the transmission system;

means for sampling and scaling the signal generated by the means for detecting to produce an interference cancellation signal;

means for combining a first input signal corresponding to the signal received from the twisted pair with a second input signal corresponding to the interference cancellation signal to eliminate or reduce interference contained in the first input signal, wherein the apparatus is located at one end of the twisted wire pair.

13. The apparatus of claim 12, wherein the interference is interference created by sources between the central office and the customer premises, the means for receiving being located at the customer premises and the twisted pair having second ends opposite the first ends, the second ends being coupled to the central office.

14. The apparatus of claim 12, wherein the interference is interference created by sources within the customer premises, and wherein the means for receiving is located at the customer premises.

15. A method for canceling interference coupled into a twisted wire pair of a transmission system connecting a central office to a customer premises, the method comprising the steps of:

receiving an electrical signal being propagated along the twisted wire pair;

detecting interference coupled into the twisted wire pair, the interference being created by a source external to the transmission system;

generating a signal relating to the detected interference;

sampling and scaling the generated signal to produce an interference cancellation signal;

combining the received signal with the interference cancellation signal to eliminate or reduce interference contained in the received signal, wherein the steps of the method are performed at one end of the twisted wire pair.

16. The method of claim 15, wherein the step of sampling and scaling includes the steps of converting the generated signal into a digital signal and processing the digital signal in a signal processor in accordance with a preselected mathematical algorithm to produce the interference cancellation signal.

17. The method of claim 16, wherein prior to the step of combining the received signal with the interference cancellation signal, the received signal is converted into a digital signal, wherein the step of combining comprises the step of subtracting the interference cancellation signal from the received signal.

18. The method of claim 17, wherein the step of detecting is accomplished with an antenna.

19. The method of claim 17, wherein the step of detecting is accomplished with an induction coil located in proximity to the twisted wire pair.

20. The method of claim 17, wherein the step of detecting is accomplished with a capacitor located in proximity to the twisted wire pair.

* * * * *